United States Patent [19]

Sherwood et al.

[11] 4,311,620

[45] Jan. 19, 1982

[54] FOUNDRY AGGREGATE BINDERS AND FOUNDRY COMPOSITIONS PREPARED THEREFROM

[75] Inventors: Donald W. Sherwood, Kenmore; Daniel T. Riordan, Buffalo, both of N.Y.

[73] Assignee: Hooker Chemicals & Plastics Corp., Niagara Falls, N.Y.

[21] Appl. No.: 147,780

[22] Filed: May 8, 1980

[51] Int. Cl.$^3$ ............... C08L 61/16; C08G 8/02; C08L 5/00
[52] U.S. Cl. .................. 260/9; 525/471; 528/73; 528/85; 528/125; 528/126; 528/128
[58] Field of Search ........... 525/471; 528/125, 126, 528/128, 73, 85; 260/DIG. 40, 9

[56] References Cited

U.S. PATENT DOCUMENTS

| | | | |
|---|---|---|---|
| 1,878,249 | 9/1932 | Moss | 528/126 |
| 1,920,100 | 7/1933 | Moss | 528/126 |
| 2,055,953 | 9/1936 | Swallen | 528/126 |
| 2,128,879 | 8/1938 | Irey | 525/471 |
| 3,123,586 | 3/1964 | Rust | 525/471 |
| 3,538,040 | 11/1970 | Grazen | 525/471 |
| 3,904,559 | 9/1975 | Furness | 260/19 R |
| 3,925,296 | 12/1975 | Stone | 260/37 N |
| 3,933,727 | 1/1976 | Schmid | 260/37 N |

FOREIGN PATENT DOCUMENTS

| | | | |
|---|---|---|---|
| 446523 | 2/1948 | Canada | 528/126 |
| 138236 | 9/1970 | Czechoslovakia . | |
| 2898 | 7/1979 | European Pat. Off. . | |

OTHER PUBLICATIONS

Product Information Bulletin, "Bofors Cold Box Binder", Bofors Co., Bofors, Sweden.
Data Sheet, "Cold Box Binder Performance Date", Harmark Litex Limited.

*Primary Examiner*—Paul Lieberman
*Attorney, Agent, or Firm*—James F. Mudd; David A. Stein

[57] ABSTRACT

Novel resin binders for foundry sand molds and cores are provided by reacting a polyol component comprising a phenol ketone resin, a reactive solvent and a crosslinking agent in a solution for these components with a solution of an organic polyisocyanate. The foundry binder cures rapidly at ambient temperature in the presence of a tertiary amine curing agent to provide strong foundry molds and cores. Polyether polyols may also be incorporated in the polyol component of the novel resin binder.

50 Claims, No Drawings

FOUNDRY AGGREGATE BINDERS AND FOUNDRY COMPOSITIONS PREPARED THEREFROM

BACKGROUND OF THE INVENTION

Foundry molds and cores used in making metal castings can be prepared from a mixture of an aggregate material which has been combined with a binding amount of a polymerizable or curable binder. The mixture is thereafter rammed, blown or otherwise introduced into a pattern and cured by the use of catalysts such as chlorine and carbon dioxide, and/or the application of heat. The present invention provides novel resin binders that cure at low temperatures, or even at room temperature.

Accordingly, it is an object of the invention to provide novel resin binders for foundry aggregates, it is also an object of the invention to provide novel resin binders for foundry aggregates that are capable of curing at low temperatures, even at room temperature. These and other objects will become apparent to one skilled in the art in the light of the following specification.

THE PRIOR ART

U.S. Pat. No. 3,925,296 is directed to a foundry sand process which does not require the addition of heat to cure the sand binder. The binder is comprised of two components, a polyol component and an isocyanate component, which are reacted together on sand in the presence of a curing agent such as a gaseous amine which rapidly cures the binder and forms strong foundry cores. In accordance with this patent, the polyol component can be a solution of a bisphenol alone in a solvent or a mixture of a bisphenol and a furan resin in a solvent. U.S. Pat. No. 3,904,559 is directed to a binder where the polyol component commprises a mixture of a bisphenol and an oxyalkylated novolac resin. U.S. Pat. No. 3,933,727 is directed to foundry binders where the polyol component comprises a mixture of a bisphenol and a polyether polyol. The patentee discloses that in addition to a bisphenol or other monomeric compounds, an aromatic compound with 1-6 benzene rings can also be employed. More recently, European Patent Convention application 78 300 761.0 discloses as a polyol component for a room temperature curing binder system, a mixture of bisphenol and a phenol terpene component. The disclosure of the three foregoing patents and application are incorporated herein by reference.

SUMMARY OF THE INVENTION

This invention relates to novel foundry aggregate binders. More particularly, the invention relates to binders for foundry aggregates which comprise a phenol ketone resin, such as a phenolacetone resin and an organic polyisocyanate. The foundry sand grains are bound together by the reaction product of the phenol ketone resin and the isocyanate. Generally the components are provided separately to the foundry in the form of solutions of the resin and isocyanate in suitable solvents.

Also contemplated in the scope of this invention is the use of a reactive solvent in the polyol component to improve the tensile strength of the binder composition. Suitable reactive solvents include the monomeric furan alcohols.

The compositions of the invention are further improved by the incorporation in the polyol component of cross-linking agents. These cross-linking agents are generally polyols of the 2-6 hydroxyl groups. Two or more types of auxiliary polyols can be employed.

Further embodiments of the invention involve the incorporation in the foregoing compositions of a polyether polyol. Typical such polyether polyols include the oxyalkylated novolac resins of U.S. Pat. No. 3,904,559 and the polyether polyols of U.S. Pat. No. 3,933,727.

DESCRIPTION OF THE PREFERRED EMBODIMENTS

The Resins

The phenolic ketone resins of the invention have the general formula:

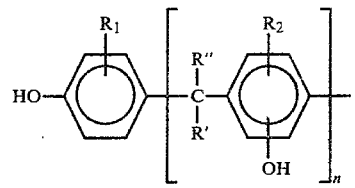

wherein R' and R" are hydrogen, alkyl of 1 to 6 carbon atoms, cycloalkyl of 5 to 6 carbon atoms, and haloalkyl of 1 to 6 carbon atoms, and can be the same or different, $R_1$ and $R_2$ are hydrogen, alkyl of 1 to 6 carbon atoms, or halogen, and n is an average of about 1.1 to 10, preferably about 1.5 to 6.

The phenol-ketone resins are prepared by reacting a phenol, for instance, phenol, ortho-cresol, meta-cresol, ortho-isopropylphenol, ortho-tertiary butylphenol, ortho-chlorophenol, various thio-substituted phenols, etc., with a ketone, such as acetone, methyl ethyl ketone, dibenzyl ketone, diethyl ketone, dibutyl ketone, cyclohexanone, etc., in the presence of a strong mineral acid, such as sulfuric or hydrochloric acid. The ratio of phenol to ketone is generally in the range of about 1 to 1 to about 6 to 1, and preferably about 1.3 to 1 to about 3 to 1. The reaction temperature is preferably elevated, suitably from about 40° to 120° C., preferably from about 70° to 110° C. When the reaction is complete, the water, unreacted ketone, phenol and low molecular weight by-products are distilled off. The resulting phenol ketone resin that is useful in the invention generally contains about 10 to 80 weight percent bisphenol, more usually about 25 to 55 weight percent bisphenol, with the remainder molecules being higher molecular weight components of the above described formula.

In preparing the resins, a minor amount, up to about 40 weight percent and preferably up to about 25 weight percent of an aldehyde can be employed based on the weight of ketone. Suitable aldehydes include formaldehyde, acetaldehyde, butyraldehyde, benzaldehyde, furfuraldehyde and the like, containing up to 8 carbon atoms. The reaction for the formation of a bisphenol from an aldehyde can be carried out in a known manner and a detailed description of this reaction is unnecessary. However, it may be mentioned that a strong mineral acid in high concentrations, such as sulfuric acid or hydrochloric acid, preferably the latter, is used to promote the condensation, and that the yield of the bisphenol is highest when the phenolic reactant is employed in a proportion exceeding that theoretically required.

By the appropriate selection of halogenated phenol, halogenated resin analogs can be obtained. Thus, by the reaction of acetone and ortho-chlorophenol, the dichlorophenol analogs may be obtained. By the reaction of ortho, ortho-dibromophenol with acetone, the 4,4'-isopropylidene-bis(2,6-dibromophenol) resin can be obtained.

The halogenated resins of the invention are readily prepared by reacting 1,1,3,3-tetrafluoro-1,3-dichloroacetone or 1,1,1,3,3-pentafluoro-3-chloroacetone with a phenolic compound of the formula:

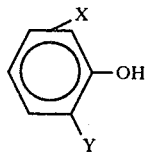

X and Y being as defined above, in a molar ratio of at least about 1 mole of phenolic compound per mol of ketone reactants, in the presence of boron trifluoride as catalyst.

1,1,3,3-tetrafluoro-1,3-dichloroacetone is a colorless liquid having a freezing point below $-100°$ C. and a boiling point of 45.2° C. 1,1,1,3,3-pentafluoro-3-chloroacetone is a colorless gas having a boiling point of 7.8° C.

As the phenolic reactants, there may be used phenol itself or its alkylated, brominated or chlorinated derivatives.

Mercapto phenol resins useful in the invention are obtained by reacting mercaptophenol rather than phenol itself with the corresponding a aldehydes and ketones as illustrated in the preparation of the resins hereinabove. Representative mercaptophenols include the ortho- and para-nonalkyl substituted mercaptophenols, as well as other mercaptophenols having an alkyl, alkylaryl, or arylalkyl substituent in which the substituent is at the ortho- or the para-position. There can be up to four such substituents on the mercaptophenol molecule. Examples of alkyl groups are methyl, ethyl, butyl, decyl, octadecyl; examples of alkylaryl and arylalkyl groups are cresyl, xylyl, tetramethylphenyl, decylphenyl, dodecylphenyl, and the like. Examples of typical compounds include phenyl mercaptophenols, mercaptonapthtols, and mercaptocresols, 2-mercapto-6-octadecylphenol, 4-mercaptophenol, 2-mercapto-4-chlorophenol, 2-mercapto-4,6-di-tert-butylphenol, and o-mercaptophenol. It should also be noted that polyhydric mercaptophenols as well as mixtures of various mercaptophenols can be used. These compounds are similarly useful as compared to the bisphenols in providing an active hydrogen for reaction with the organic polyisocyanate of the invention.

Reactive Solvents

Reactive solvents useful for use in the composition of the invention include mono-alcohols of 1 to about 10 carbon atoms. Suitable alcohols include methanol, ethanol, butanol, isopropanol, cyclohexanol, ethylene chlorohydrin, allyl alcohol, γ-phenylethyl alcohol, p-nitrobenzyl alcohol, methylvinylcarbinol, cinnamyl alcohol.

Preferred reactive solve solvents are the furan alcohols such as furfuryl alcohol and tetrahydrofurfuryl alcohol.

Cross-linking Agents

Suitable cross-linking agents for use in the compositions of the invention include polyhydric alcohols of two to six carbon atoms. Suitable diols include ethylene glycol, diethylene glycol, triethylene glycol, propylene glycol, dipropylene glycol, polypropylene glycol, 1,2-butylene glycol, 1,3-butylene glycol, 1,4-butylene glycol, 2,3-butylene glycol, 2,3-pentane diol, 2,4-pentane diol, 3,3-pentane diol, 2,2-propylene glycol, 2,2,4-trimethyl-1,3-pentane diol, neopentyl glycol, hexamethylene diol-1,6, octamethylene diol-1,8, and decamethylene diol-1,10. Suitable triols include glycerol, hexanetriol, trimethyloethane, trimethylolpropane and the like. Suitable alcohols having four to six hydroxyl groups include pentaerythritol, dipenta-aerythritol, sorbitol, mannitol, γ-methyl glucoside, dextrose, fructose, anhydroaneaheptitol, 2,2,6,6-tetramethylolcyclohexanol, and the like.

Polyether Polyols

Polyether polyols suitable for use in the invention are generally prepared by reacting aliphatic or aromatic polyhydric alcohols such as described hereinabove with alkylene oxides such as ethylene oxide, propylene oxide and other suitable oxides, preferably having two to six carbon atoms. Aliphatic diamines may also be used as reactants with the alkylene oxides to produce suitable polyether polyols. Suitable diamines include those having two to six carbon atoms such as ethylene diamine, propylene diamine, butylene diamine, and the like. There are many commercially available polyether polyols produced by reacting ethylene oxide and/or propylene oxide with polyhydric alcohols such as disclosed hereinabove. Particularly well known polyether polyols include those resulting from the reaction of propylene oxide with sugars such as sucrose. Another commercially available polyether polyol is the reaction product of propylene oxide and bisphenol-A.

The polyether polyol of the invention may also comprise an oxyalkylated phenol-aldehyde resin such as an oxyalkylated phenolformaldehyde novolac resin prepared by reacting such a novolac resin with an alkylene oxide such as propylene oxide or ethylene oxide as described in U.S. Pat. No. 3,904,559, the disclosure of which is incorporated herein by reference.

The reactive solvents, cross-linking agents and polyether polyols can be used in various proportions in the compositions of the invention. However, the total amount of these components is generally in the range of about two to about 30 weight percent of the total weight of the solution of polyol components including the phenol-ketone, or in the proportion of abut five to about 75 weight percent of the phenol-ketone resin alone. The polyether polyol is an optional component so that all of the foregoing proportions of auxiliary polyol component may be comprised of reactive solvent and cross-linking agent. The reactive solvent generally comprises about one to about 10 weight percent of the total polyol component solution. The cross-linking agent generally comprises about one to about 15 weight percent of the total polyol component solution. When a polyether polyol component is employed, it is generally included in proportion of about five to about 25 weight percent of the total polyol component solution.

Diluent Solvents

Suitable solvents or diluents for the polyol component of the invention include polar compounds such as the aliphatic ketones of 3 to 8 carbon atoms, such as acetone, methyl ethyl ketone, methyl n-propyl ketone, diethyl ketone, hexanone, cyclohexanone, and the like; and the monoester-monoethers of alkylene glycols of 2 to 10 carbon atoms, such as ethylene glycol (Carbitol), diethylene glycol (Cellosolve), propylene glycol, butylene glycol, and the like. Typical members of the latter class include cellosolve acetate, methyl cellosolve acetate, butyl cellosolve acetate, carbitol acetate, butyl carbitol acetate, and mixtures thereof. Mixtures of the foregoing classes of solvents or diluents can also be employed. Auxiliary solvents can also be admixed with the foregoing classes of solvents or diluents, such as non-polar compounds, such as aromatic hydrocarbons of 6 to 10 carbon atoms, such as benzene, toluene, xylene, ethyl benzene, diethyl benzene, monochlorobenzene, and the like, aliphatic hydrocarbons, such as hexane, octane, mineral spirits, petroleum naphtha, and the like. Since the polyisocyanates are not generally compatible with polar compounds, mixtures of the polar and non-polar solvents are most preferred for use in the invention.

Suitable solvents or diluents for mixtures of binder components comprising the phenol-ketone resins of the invention and the other alcohol and polyol components, are generally employed in the proportion of about 25 to about 65 parts by weight per 100 parts of total mixed solids of said binder components, preferably in the proportion of from about 35 to 55 parts by weight of solvent per 100 parts of total mixed solids of the binder components.

Polyisocyanates

Various organic polyisocyanates can be used in preparing the compositions of the invention. Where the binder composition includes a component or components, other than the polyisocyanate, having a functionality averaging more than 2, diisocyanates and triisocyanates can be used such as 2,4-toluene diisocyanate, 2,6-toluene diisocyanate, and mixtures thereof, and particularly the crude mixtures thereof that are commercially available. Other typical polyisocyanates include methylene bis(4-phenyl) isocyanate, n-hexyl diisocyanate, 1,5-naphthalene diisocyanate, 1,3-cyclopentylene diisocyanate, p-phenylene diisocyanate, 2,4,6-toluene triisocyanate, 4,4',4''-triphenylmethyl triisocyanate. Also contemplated are the many impure or crude polyisocyanate that are commercially available. Where the binder composition includes a component or components other than the polyisocyanate, having no more than difunctionality, polyisocyanates with a functionality averaging more than 2 are required. Especially preferred for use in the invention are the polyaryl polyisocyanates having the following generalized formula

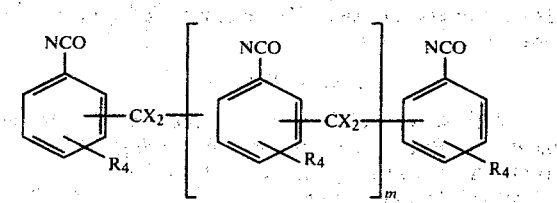

wherein $R_4$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least 0.5 and generally about 0.5 to 1.6, preferably 0.6 to about 1.3. A preferred example is polymethylene polyphenyl polyisocyanate having an average functionality of 3. The organic polyisocyanate is preferably employed in a solution of the solvents hereinbefore described. The preferred solvent for a polyisocyanate is a non-polar solvent such as the aforesaid aromatic hydrocarbons. Since the polyisocyanates are not generally compatible with non-polar solvent, the most preferred solvent for use in the invention is a mixture of the non-polar solvent with the polar solvents described hereinabove. The solvent for the polyisocyanate component is generally employed in a ratio of about 15 to about 60 parts by weight of solvent per 100 parts of solids of the organic polyisocyanate, preferably about 25 to about 50 parts by weight of solvent per 100 parts of the organic polyisocyanate.

Other Additives

Other additives can be used to enhance the foundry compositions of the invention such as mold release agents. Other useful additives are the silane coupling agents having the general formula

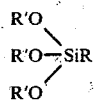

wherein $R'$ is a hydrocarbon radical and preferably an alkyl radical of 1 to 6 carbon atoms and R is an alkyl radical, an alkoxy-substituted alkyl radical or an alkyl-amino-substituted alkyl radical in which the alkyl groups have from 1 to 6 carbon atoms. The aforesaid silane, when employed in concentrations of 0.1 to 2% based on the binder, improves the adhesion of the phenolic binder to the foundry aggregate particle.

The Process

In the preparation of the moldable compositions of the invention, foundry aggregate is placed in a conventional muller or other suitable mixer. The aggregate of discrete inert particles is normally sand and frequently contains minor amounts of other materials such as iron oxide, cereal, and the like. A binder component consisting of a solution of a phenol-ketone resin and optionally a reactive solvent and a cross-linking agent, an inert diluent, and an organic silane is introduced to the aggregate in a proportion sufficient to provide about 0.4 to 5 weight percent of said binder component based on the weight of the foundry aggregates, preferably in the range of about 0.6 to 2.5 weight percent and is mixed for 0.5 to 10 minutes, preferably about 1 to about 3 minutes. The aggregate grains are thereby coated with the sand binder component. Thereafter, a polyisocyanate component consisting of a polyisocyanate or solution thereof is introduced to the mixture of aggregate, solvent, and said binder component and mixing in continued for about 1 to 5 minutes, preferably about 2 to 3 minutes. The organic polyisocyanate component is employed in a proportion sufficient to provide about 0.4 to about 5 weight percent of polyisocyanate component based on the weight of the foundry aggregate, preferably in the range of about 0.5 to 2.5 weight percent, the proportion of total binder components plus polyisocyanate component is in the range of about 0.8 to 10 weight percent based on the weight of foundry aggregate, preferably about 1 to 5 weight percent. A portion of the solvent generally evaporates in the muller. The said polyol component and polyisocyanate are employed in a ratio sufficient to provide about 0.9 to about 1.1 isocyanato groups per hydroxyl group, preferably about one isocyanato group per hydroxyl group. The resulting moldable composition is then discharged from the mixer and introduced into a suitable mold of the desire shape.

The moldable composition can also be prepared by employing an apparatus known as a "slinger" which comprises two screw conveyors which converge at a common point into a single screw conveyor. Herein, a portion of the foundry aggregate and the resin are introduced into one of the two feed screw conveyors. The polyisocyanate and the remainder of the foundry aggregate is introduced into the second of the feed screw conveyors. The two screw conveyors discharge the sand coated with respective components into the common screw conveyor where all of the reacting components are intimately mixed with the total charge of foundry aggregate. Any commercially available continuous mixer for coated foundry sand can be employed with the products of the invention.

The moldable composition is introduced into a suitable mold and cured at room temperature by employing a tertiary amine as a catalyst. Although it is especially preferred to employ a gaseous tertiary amine, volatilized tertiary amines in an inert gas stream such as nitrogen, carbon dioxide or air can be employed. Suitable tertiary amines, which generally contain up to 20 carbon atoms, include trimethylamine, triethylamine, tributylamine, tripropylamine, dimethyl-sec-butylamine, N,N-dimethylaniline, N-methyl-N-ethylaniline, p-nitroso-N,N-dimethylaniline, N-methyl morpholine, N-ethyl morpholine, tetramethylguanidine, N,N,N',N'-tetramethyl-1,3-butanediamine, triethylenediamine, and the like. The preferred gaseous tertiary amines are triethylamine and dimethylethylamine. Gassing can be effected by placing manifolds across the top and bottom of the core to form a tight seal and then passing the gaseous amine of volatilized amine in an inert gas stream through the core.

Also, if desired, a conventional hydroxylisocyanate catalyst such as dibutyltin dilaurate, dibutyltin diacetate, zinc naphthanate, lead naphthanate, and the like, can be present in the resinous composition to the extent of about 0.1 to about 5 weight percent based on the total weight of the binder composition, preferably about 3 to about 5 weight percent.

The moldable composition of the invention can be cured at room temperature or, if desired, at higher or lower curing temperatures, i.e., from about 10° to about 100° C. or higher, to form a polyurethane reaction product of the hydroxyl containing components of the polyol component and the polyisocyanate. The cured foundry aggregate compositions generally contain about 0.5 to about 9 weight percent of total polyurethane binder composition (dry basis) based on the weight of foundry aggregate, preferably about 0.5 to about 5 weight percent. The compositions exhibit superior properties, such as tensile strength, flowability of the binder aggregate composition, release from the mold, retention of strength at elevated temperatures (e.g., 150°–300° F.) and elevated humidity, and rapid build-up of strength, compared to conventional cured foundry molds and cores. The products of this invention attain over 50 percent of their ultimate strength within two minutes after catalyzation.

The following examples illustrate the various aspects of the invention but are not intended to limit it. Where not otherwise specified throughout this specification and claims, temperatures are given in degrees centigrade and parts are by weight.

EXAMPLE A—Resin Preparation

A phenol acetone resin is prepared as follows: 2500 parts of phenol and 25 parts of 37 percent HCl are charged to a reaction vessel, and heated to 45°–50° C. 1305 parts of acetone are added dropwise and allowed to reflux. When all the acetone is introduced, the mixture is refluxed for 90 minutes. Partial vacuum is applied to the reaction vessel equipped for distillation, and the contents are heated to 95° C. Full vacuum is applied and the temperature is raised to 105° C. Then conditions are held until the resin has a clear melting point of 59°–68° C. This melting point is held until the product has an 0.2 gram included plate flow of less than 140 mm. The reaction product is discharged, cooled and broken into particles.

EXAMPLE 1

A polyol component solution is prepared by mixing 40 parts of a phenol acetone resin of the type described in Example A and containing about 40 weight percent bisphenol monomer component, with 14.2 parts of methylethyl ketone, 2 parts of trimethylol propane, 1.5 part trimethyl pentanediol, 28.4 parts of high Molecular weight toluene type solvent sold under the tradename SC 150 by Buffalo Solvents & Chemicals Co., 6 parts of dibutyl phthalate, 2.5 parts of butyl stearate, 0.6 part of γ-aminopropyltriethoxysilane and 4.8 parts of tetrahydrofurfuryl alcohol. The components are mixed thoroughly.

An isocyanate solution is prepared by mixing 75 parts by weight of a commercial polymeric methylene diisocyanate sold under the tradename PAPI by the Upjohn Company, 24.5 parts of the SC 150 solvent described herebefore and 0.5 part of n-butyl acid phosphate.

Thereafter, 26.2 grams of the above described polyol component and 21.4 grams of the above described isocyanate component are mixed with seven pounds of Lake Shore foundry sand to provide 1.5 weight percent total resin of the sand. Test specimens are prepared by injecting triethylamine gas into a resin-sand molded specimen under 80 psi nitrogen pressure for 10 seconds, followed by a 10 second purge with air at a pressure of 60 psi. The flow rate of triethylamine is 5 cm.$^3$/minute. The sand temperature is 75° F., the room temperature is 76° F. and the percent relative humidity is 51. Test specimens are made at various intervals of time and tested for tensile strength. Two measurements are made at each interval of time. The measurements were averaged and the results are shown in Table 1.

EXAMPLES 2-5

The procedure of Example 1 is repeated except that in Examples 2, 3 and 4 portions of the phenol acetone resins are replaced by bisphenol-A. In Example 5 only bisphenol-A is employed to serve as a comparison with the teaching of U.S. Pat. No. 3,925,296. Slight changes are made in the proportions of the components to provide generally the same reactivity and to balance the formulations to total 100 parts each. Resin sand mixtures are prepared as in Example 1 and test specimens are prepared and tested. The results are shown in Table 1.

TABLE 1

| Example No. | 1 | 2 | 3 | 4 | 5 |
|---|---|---|---|---|---|
| Phenol Acetone Resin | 40 | 30 | 20 | 10 | 0 |
| Bisphenol-A | 0 | 9.1 | 18.3 | 27.4 | 36.6 |
| Methyl Ethyl Ketone | 14.2 | 14.5 | 14.8 | 15.1 | 15.3 |
| SC-150 Solvent | 28.4 | 29.0 | 29.5 | 30.1 | 30.7 |
| Trimethylol Propane | 2 | 2 | 2 | 2 | 2 |
| Trimethyl Pentanediol | 1.5 | 1.5 | 1.5 | 1.5 | 1.5 |
| Tetrahydrofurfuryl Alcohol | 4.8 | 4.8 | 4.8 | 4.8 | 4.8 |
| Dibutyl Phthalate | 6 | 6 | 6 | 6 | 6 |
| Butyl Stearate | 2.5 | 2.5 | 2.5 | 2.5 | 2.5 |
| Silane | 0.6 | 0.6 | 0.6 | 0.6 | 0.6 |
| Sand Temp. °F. | 82 | 77 | 80 | 77 | 75 |
| Room Temp. °F. | 81 | 77 | 79 | 79 | 76 |
| Relative Humidity, % | 58 | 66 | 55 | 57 | 51 |
| TEA Pressure, psi | 80 | 80 | 80 | 80 | 80 |
| Air Pressure, psi | 60 | 60 | 60 | 60 | 60 |
| Flow, cm.$^3$/minute | 5 | 5 | 5 | 5 | 5 |
| Tensile Strength, psi | | | | | |
| 1 min. | 183 | 186 | 125 | 74 | 26 |
| 5 min. | 220 | 209 | 173 | 136 | 50 |
| 30 min. | 240 | 227 | 230 | 206 | 115 |
| 60 min. | 246 | 237 | 227 | 222 | 132 |
| 24 hrs. | 278 | 264 | 251 | 251 | 179 |

EXAMPLE 6

A polyol component solution is prepared by mixing 56.25 parts of the phenol acetone resin used in Example 1, 6 parts of an oxyethylated phenol formaldehyde novalac resin and 6 parts of an oxypropylated phenol formaldehyde novalac resin, such as described in U.S. Pat. No. 3,904,599, 12 parts of n-butyl alcohol, 12 parts of methylethyl ketone, 24 parts of the SC 150 solvent, 2.5 parts of butyl stearate, 0.3 part of γ-glycidoxypropyl trimethoxy silane and 0.3 parts of water.

An isocyanate component solution is prepared by mixing 65 parts of a commercial polymeric methylene diisocyanate sold by Mobay, under the tradename Mondur MR, 25 parts of SC 150 solvent, 10 parts of cellosolve acetate.

Thereafter, 31.8 grams of the above described polyol component solution and 31.8 grams of the above described isocyanate component solution are mixed with seven pounds of Lake Shore foundry sand comprising two percent total binder. The sand temperature is 77° F., the room temperature is 76° F. and the percent relative humidity is 66. Test specimens are prepared over various intervals of time by injecting triethylamine under a nitrogen pressure of 80 psi for 10 seconds followed by an air purge at a pressure of 60 psi for 10 seconds. The tensile strength of the test specimens is determined by taking one average of two measurements for each time interval. The results are shown in Table 2.

EXAMPLE 7

The procedure of Example 6 is repeated except that in place of the phenol acetone resin there was employed monomeric bisphenol-A for a comparision with the teaching of U.S. Pat. No. 3,904,559. The proportions of components and test results are shown in Table 2.

TABLE 2

| Example No. | 6 | 7 |
|---|---|---|
| Phenol Acetone Resin | 56.25 | 0 |
| Bisphenol-A | 0 | 37.3 |
| Oxyethylated Novolac | 6 | 6 |
| Oxypropylated Novolac | 6 | 6 |
| Methyl Ethyl Ketone | 12 | 12 |
| SC-150 Solvent | 24 | 24 |
| Butyl Stearate | 2.5 | 2.1 |
| n-butyl Alcohol | 12 | 12 |
| Silane | 0.3 | 0.3 |
| Water | 0.3 | 0.3 |
| Sand Temp. °F. | 77 | 80 |
| Room Temp. °F. | 76 | 77 |
| Relative Humidity, % | 66 | 70 |
| TEA Pressure, psi | 84 | 94 |
| Air Pressure, psi | 60 | 60 |
| Flow, cm.$^3$/minute | 5 | 5 |
| Tensile Strength, psi | | |
| 1 min. | 156 | 65 |
| 5 min. | 141 | 117 |
| 30 min. | 170 | 150 |
| 60 min. | 179 | 165 |
| 24 hrs. | 160 | 169 |

EXAMPLES 8–13

In these examples the phenol acetone resin of the invention is employed together with a polyether polyol.

In Example 8, 12 parts by weight of the polyether prepared from a short chain triol and propyleneoxide, and marketed by the Dow Chemical Company under the tradename Voranol 2025 is mixed with 39.5 parts by weight of the phenol-acetone resin of Example 1, 2.5 parts of butyl stearate, 6.0 parts of dibutyl phthalate, 16.7 parts of methylethyl ketone, 16.7 parts of SC 150 solvent, 1.5 parts of trimethyl pentane diol, 4.5 parts of furfuryl alcohol and 0.6 parts of γ-aminopropyltriethoxysilane.

An isocyanate component solution is prepared by mixing 75 parts by weight of a comercially available polymeric methylene diisocyanate sold under the tradename of Mondur MR by the Mobay Chemical Company, 10 parts of cellosolve acetate and 15 parts of SC 150 solvent.

Thereafter, 31.8 grams of the polyol solution, 31.8 grams of the isocyanate component solution is mixed with seven pounds of Lake Shore sand to provide 2% total resin of the sand. The resulting resin sand mixture is tested with a sand temperature of 75° F., room temperature of 73° F., at 59% relative humidity. The triethylamine gas was blown through molded test specimens at 80 psi nitrogen pressure for 10 seconds followed by air pressure of 60 psi for 10 seconds to provide a triethylamine flow rate of 5 cm.$^3$/minute. The test specimens are taken at various intervals of time. Tensile strength of the specimens is determined by taking an average of two measurements for each time interval. The results are shown in Table 3.

In Example 9, a polyether polyol prepared from propyleneoxide and a short chain triol, sold by the Dow Chemical Company under the tradename Voranol 2070 is used with the phenol acetone resin of Example 1 following the procedure of Example 8. The proportions of components and test results are shown in Table 3.

In Example 10, 12 parts by weight of a polyether polyol prepared from a glycol and propylene oxide and end-capped with ethylene oxide is employed with the phenol acetone resin of Example 1 following the procedure of Example 8. Then 31.8 grams of the polyol component and 31.8 grams of the isocyanate component of Example 8 are mixed with seven pounds of Lake Shore sand to provide a total resin content of 2% on the sand. Test specimens are prepared and tested as in Example 8 and results are shown in Table 3.

In Example 11, 12.0 parts by weight of a polyether polyol prepared from a triol and propylene oxide and end-capped with ethylene oxide, sold under the tradename Poly G 30-280, by the Olin Chemical Corporation, is used to prepare a polyol component solution with the phenol acetone resin of Example 1. The proportions of components employed are shown in Table 3.

31.8 grams of the polyol solution and 31.8 grams of the isocyanate component solution of Example 8 are blended with seven pounds of Lake Shore sand providing a total resin content on the sand of 2%. Test specimens were prepared and tested as in Example 8 and results are shown in Table 3.

In Examples 12 and 13, two polyether polyols prepared from sugar and propylene oxide and designated by the tradename of Multranol 4030, and Multranol 4034 by Mobay Chemical Company are utilized with the phenol acetone resin of Example 1 to prepare polyol component solutions. The proportions of components is shown in Table 3.

31.8 grams of the polyol solutions and 31.8 grams of the isocyanate component solution of Example 8 were mixed with seven pounds of Lake Shore sand to provide two weight percent resin on the sand.

Test specimens were prepared and tested as in Example 8 and the results are shown in Table 3.

TABLE 3

| Example No. | 8 | 9 | 10 | 11 | 12 | 13 |
|---|---|---|---|---|---|---|
| Phenol Acetone Resin | 39.5 | 39.5 | 39.5 | 39.5 | 39.5 | 39.5 |
| Polyether Polyol | 12.0 | 12.0 | 12.0 | 12.0 | 12.0 | 12.0 |
| Methyl Ethyl Ketone | 16.7 | 13.4 | 13.4 | 13.5 | 9 | 10.9 |
| SC-150 Solvent | 16.7 | 13.4 | 13.4 | 13.5 | 18 | 18 |
| Trimethyl Pentanediol | 1.5 | 8.1 | 6.3 | 6.2 | 0 | 0 |
| Furfuryl Alcohol | 4.5 | 4.5 | 6.3 | 6.2 | 12.4 | 10.5 |
| Dibutyl Phthalate | 6.0 | 6.0 | 6.0 | 6.0 | 6.0 | 6.0 |
| Butyl Stearate | 2.5 | 2.5 | 2.5 | 2.5 | 2.5 | 2.5 |
| Silane | 0.6 | 0.6 | 0.6 | 0.6 | 0.6 | 0.6 |
| Sand Temp. °F. | 75 | 80 | 77 | 80 | 78 | 77 |
| Room Temp. °F. | 73 | 78 | 79 | 80 | 78 | 77 |
| Relative Humidity, % | 59 | 56 | 55 | 57 | 67 | 65 |
| TEA Pressure, psi | 80 | 80 | 80 | 80 | 80 | 80 |
| Air Pressure, psi | 60 | 60 | 60 | 60 | 60 | 60 |
| Flow, cm.³/minute | 5 | 5 | 5 | 5 | 5 | 5 |
| Tensile Strength, psi | | | | | | |
| 1 min. | 119 | 94 | 100 | 82 | 129 | 127 |
| 5 min. | 175 | 163 | 170 | 158 | 218 | 210 |
| 30 min. | 243 | 202 | 233 | 218 | 246 | 235 |
| 60 min. | 243 | 173 | 242 | 234 | 258 | 244 |
| 24 hrs. | 286 | 231 | 268 | 245 | 279 | 283 |

The process of the invention has been described and exemplified with respect to an embodiment wherein the polyol component and isocyanate component are mixed on the foundry aggregate, and the foundry composition is cured by passing a volitalized amine through the shaped composition. Alternatively, the tertiary amine catalyst can be incorporated in the polyol component prior to mixing the components on the foundry aggregate. In this embodiment, the polyol component containing the amine curing agent and the isocyanate component are mixed with the aggregate and introduced into a suitable mold. The resulting compositions cure at ambient temperature. The higher boiling amines, such as N-methyl morpholine are preferred in this embodiment of the invention.

While this invention has been described with respect to certain embodiments, these are intended to be illustrative and not to limit the invention.

We claim:

1. A binder composition for foundry aggregates which comprises a solution of an inert solvent and a room temperature curable composition consisting essentially of the components:
   (1) a phenol-ketone resin having the general formula:

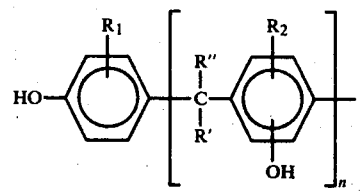

wherein R' and R" are alkyl of 1 to 6 carbon atoms, cycloalkyl of 5 to 6 carbon atoms, or haloalkyl of 1 to 6 carbon atoms, and can be the same or different, $R_1$ and $R_2$ are hydrogen, alkyl of 1 to 6 carbon atoms, or halogen, and n is an average of about 1.1 to 10, and
   (2) an organic polyisocyanate in a proportion to provide from about 0.9 to 1.1 reactive isocyanate groups per reactive hydrogen present in said curable composition.

2. The composition of claim 1 wherein the room temperature curable composition also comprises a reactive solvent.

3. The composition of claim 2 wherein the reactive solvent is furfuryl alcohol.

4. The composition of claim 2 wherein the reactive solvent is tetrahydrofurfuryl alcohol.

5. The composition of claim 1 wherein the room temperature curable composition also comprises a cross-linking agent.

6. The composition of claim 5 wherein the cross-linking agent is trimethylol propane.

7. The composition of claim 5 wherein the cross-linking agent is trimethylpentane diol.

8. The composition of claim 1 wherein the room temperature curable composition also comprises a reactive solvent and a cross-linking agent.

9. The composition of claim 8 wherein the room temperature curable composition also comprises a polyether polyol.

10. The composition of claim 9 wherein the polyether polyol comprises the reaction product of a polyol of 2 to 6 hydroxyl groups with an alkylene oxide.

11. The composition of claim 10 wherein the alkylene oxide is ethylene oxide, propylene oxide or a mixture thereof.

12. The composition of claim 11 wherein the polyol is a glycol.

13. The composition of claim 11 wherein the polyol is a triol.

14. The composition of claim 11 wherein the polyol is a sugar.

15. The composition of claim 11 wherein the polyol is a novolac resin.

16. The composition of claim 8 wherein the inert solvent is a mixture of a ketone and an aromatic solvent.

17. The composition of claim 8 wherein the organic polyisocyanate has the formula

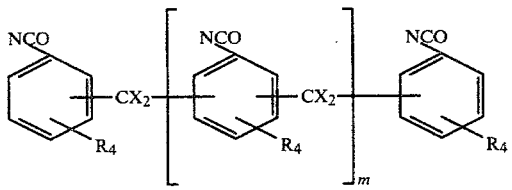

wherein R₄ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms, and phenyl; and m has an average value of at least about 0.5.

18. The composition of claim 8 which also comprises a silane coupling agent.

19. A foundry aggregate composition comprising a foundry aggregate and the composition of claims 1, 2, 5, 8 or 9.

20. A foundry composition which comprises the composition of claim 19 cured with a tertiary amine.

21. A composition of claim 20 wherein the tertiary amine is triethyl amine or dimethylethyl amine.

22. A foundry aggregate composition comprising a foundry aggregate and a binder composition consisting essentially of the cured reaction product of:
(1) a phenol-ketone resin having the general formula:

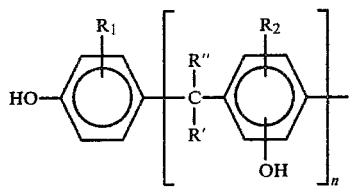

wherein R' and R" are alkyl of 1 to 6 carbon atoms, cycloalkyl of 5 to 6 carbon atoms, or haloalkyl of 1 to 6 carbon atoms, and can be the same or different, R₁ and R₂ are hydrogen, alkyl of 1 to 6 carbon atoms, or halogen, and n is an average of about 1.1 to 10, and
(2) an organic polyisocyanate in a proportion to provide from about 0.9 to 1.1 reactive isocyanate groups per reactive hydrogen present in the uncured composition.

23. The composition of claim 22 wherein the binder composition also comprises a reactive solvent.

24. The composition of claim 23 wherein the reactive solvent is furfuryl alcohol.

25. The composition of claim 23 wherein the reactive solvent is tetrahydrofurfuryl alcohol.

26. The composition of claim 22 wherein the binder composition also comprises a cross-linking agent.

27. The composition of claim 26 wherein the cross-linking agent is trimethylol propane.

28. The composition of claim 26 wherein the cross-linking agent is trimethylpentane diol.

29. The composition of claim 22 wherein the binder composition also comprises a reactive solvent and a cross-linking agent.

30. The composition of claim 29 wherein the binder composition also comprises a polyether polyol.

31. The composition of claim 30 wherein the polyether polyol comprises the reaction product of a polyol of 2 to 6 hydroxyl groups with an alkylene oxide.

32. The composition of claim 31 wherein the alkylene oxide is ethylene oxide, propylene oxide or a mixture thereof.

33. The composition of claim 32 wherein the polyol is a glycol.

34. The composition of claim 32 wherein the polyol is a triol.

35. The composition of claim 32 wherein the polyol is a sugar.

36. The composition of claim 32 wherein the polyol is a novolac resin.

37. The composition of claim 29 wherein the composition also comprises a silane coupling agent.

38. A process for binding discrete, inert, solid particles which comprises:
(1) coating said particles with a room temperature curable binder composition consisting essentially of components:
(A) a phenol-ketone resin having the general formula:

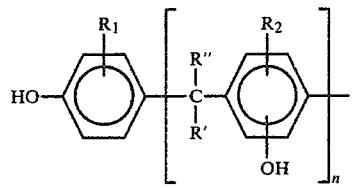

wherein R' and R" are alkyl of 1 to 6 carbon atoms, cycloalkyl of 5 to 6 carbon atoms, or haloalkyl of 1 to 6 carbon atoms, and can be the same or different, R₁ and R₂ are hydrogen, alkyl of 1 to 6 carbon atoms, or halogen, and n is an average of about 1.1 to 10, and
(B) an organic polyisocyanate in a proportion to provide from about 0.9 to 1.1 reactive isocyanate groups per reactive hydrogen present in the curable composition, and
(2) curing the resulting composition in the presence of a tertiary amine.

39. The process of claim 38 wherein the room temperature curable composition also comprises a reactive solvent.

40. The process of claim 39 wherein the reactive solvent is furfuryl alcohol.

41. The process of claim 38 wherein the room temperature curable composition also comprises a cross-linking agent.

42. The process of claim 41 wherein the cross-linking agent is trimethylol propane.

43. The process of claim 41 wherein the cross-linking agent is trimethylpentane diol.

44. The process of claim 38 wherein the room temperature curable composition also comprises a reactive solvent and a cross-linking agent.

45. The process of claim 44 wherein the room temperature curable composition also comprises a polyether polyol.

46. The process of claim 45 wherein the polyether polyol comprises the reaction product of a polyol of 2 to 6 hydroxyl groups with an alkylene oxide.

47. The process of claim 44 wherein the inert solvent is a mixture of a ketone and an aromatic solvent.

48. The process of claim 47 wherein the tertiary amine is a volatilized tertiary amine.

49. The process of claim 48 wherein the tertiary amine is triethyl amine or dimethylethyl amine.

50. The process of claim 47 wherein the tertiary amine is incorporated in the polyol component.

* * * * *